F. R. & W. O. SUTTON.
Thrashing-Machines.

No. 140,440.

Patented July 1, 1873.

Witnesses:

Inventor:
F. R. Sutton
W. O. Sutton
Per
Attorneys.

UNITED STATES PATENT OFFICE.

FREDERICK R. SUTTON AND WILLIAM O. SUTTON, OF WELLINGTON, ILL.

IMPROVEMENT IN THRASHING-MACHINES.

Specification forming part of Letters Patent No. 140,440, dated July 1, 1873; application filed March 29, 1873.

*To all whom it may concern:*

Be it known that we, FREDERICK R. SUTTON and WILLIAM O. SUTTON, of Wellington, in the county of Iroquois and State of Illinois, have invented a new and Improved Thrashing-Machine, of which the following is a specification:

The invention consists in the improvement of thrashers, as hereinafter described and pointed out in the claims.

Figure 1:
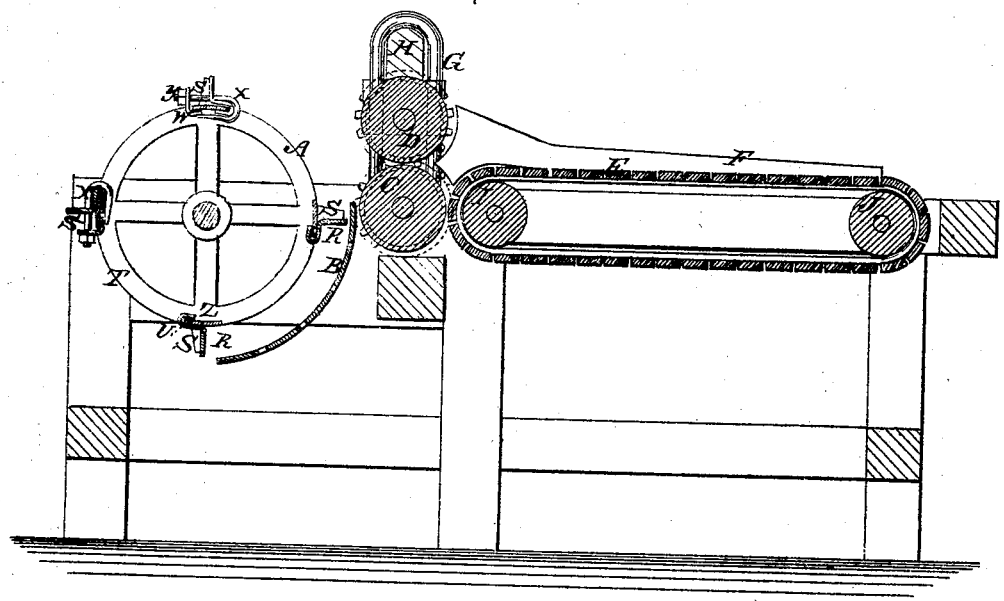
Figure 2:
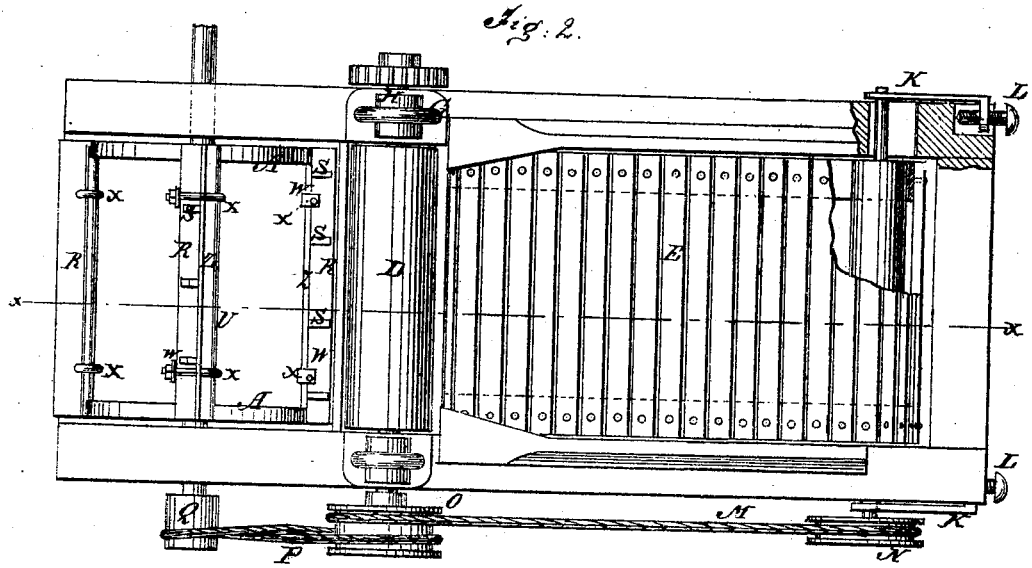

Figure 1 is a longitudinal sectional elevation of a thrashing-machine constructed according to my improvement. Fig. 2 is a plan view.

Similar letters of reference indicate corresponding parts.

A represents the cylinder, and B the concave, which are designed more particularly for beating and thrashing flax, but may be used for thrashing grain, at least the cylinder can, but it may be desirable to change the concave. C and D represent the crushing-rollers arranged directly in front of the upper edge of the concave so as to deliver the flax and grain to it. E represents the endless roller or apron which is arranged on a feed-table, F, in front of the rollers C D for delivering to them. The lower roller is mounted in stationary bearings, but the upper one is arranged in movable bearings to slide up and down in the yoke G; and springs, H, of elastic rubber, are arranged in yokes above them, so as to allow roller D to rise, as required by the flax or grain passing under it, and to keep the press down thereon, no matter how much or little it may be. The apron works over rollers I and J, the latter bearing at the outer end of the table, and arranged in adjustable bars K, which are provided with adjusting-screws L, by which the requisite tension may be maintained on the apron. This roller is driven by a belt, M, working on a pulley, N, on one end of it, and driven by a pulley, O, on the shaft of the roller C, and this roller is driven by a belt, P, from pulley O on the thrashing-cylinder. The beater-blades R of the thrashing-cylinder are arranged upon projections S of the arms of the cylinder beyond the head I, and they are screwed by hook-shaped angle-bars U, which engage the bars V of the cylinder at one edge, and are clamped by the clips W, which engage the other edge of bar V, and are held by hook-bolts X, arranged as represented in Fig. 1, and secured by nuts y.

Having thus described our invention, we claim as new and desire to secure by Letters Patent—

1. The combination, with the cylinder and concave of a thrashing-machine, of crushing-rollers D C and an endless carrier, E, substantially as described.

2. The adjustable blades of the beaters secured to the arms of the cylinder by extensions S, hook-shaped angle-bars U, clips W, and hook-bolts X, as described.

FREDERICK R. SUTTON.
WILLIAM O. SUTTON.

Witnesses:
LOVED W. REED,
GEORGE W. GOOD.